US012572376B1

(12) United States Patent
Kallakuri

(10) Patent No.: US 12,572,376 B1
(45) Date of Patent: Mar. 10, 2026

(54) LOCAL CONTAINER IMAGE CACHING AND RETRIEVAL FOR DEVICES AT EDGE LOCATIONS

(71) Applicant: Amazon Technologies, Inc., Seattle, WA (US)

(72) Inventor: Kumar Deepak Syam Kallakuri, Fremont, CA (US)

(73) Assignee: Amazon Technologies, Inc., Seattle, WA (US)

( * ) Notice: Subject to any disclaimer, the term of this patent is extended or adjusted under 35 U.S.C. 154(b) by 973 days.

(21) Appl. No.: 17/709,151

(22) Filed: Mar. 30, 2022

(51) Int. Cl.
*G06F 9/455* (2018.01)

(52) U.S. Cl.
CPC .. *G06F 9/45558* (2013.01); *G06F 2009/4557* (2013.01); *G06F 2009/45595* (2013.01)

(58) Field of Classification Search
CPC ......... G06F 9/45558; G06F 2009/4557; G06F 2009/45595
See application file for complete search history.

(56) References Cited

U.S. PATENT DOCUMENTS

| | | | |
|---|---|---|---|
| 6,898,702 | B1 | 5/2005 | Evans |
| 7,174,384 | B2 | 2/2007 | Cheung et al. |
| 7,200,669 | B2 | 4/2007 | Cheung et al. |
| 7,260,640 | B1 | 8/2007 | Kramer et al. |
| 7,574,728 | B2 | 8/2009 | Cheung et al. |
| 7,984,473 | B1 | 7/2011 | Casile et al. |
| 8,325,600 | B2 | 12/2012 | Connor et al. |

| | | | |
|---|---|---|---|
| 8,504,665 | B1 | 8/2013 | Sutherland et al. |
| 9,851,980 | B1 | 12/2017 | Li et al. |
| 10,154,065 | B1 | 12/2018 | Buchler et al. |
| 10,367,957 | B1 | 7/2019 | Schleede et al. |
| 10,922,090 | B1 | 2/2021 | Lieberman et al. |
| 10,970,113 | B1 | 4/2021 | Kurtzer et al. |
| 11,093,297 | B2 | 8/2021 | Watt et al. |
| 11,194,483 | B1 | 12/2021 | Dontu et al. |
| 11,573,816 | B1 | 2/2023 | Featonby et al. |
| 11,902,081 | B1 | 2/2024 | Sharma et al. |

(Continued)

OTHER PUBLICATIONS

Non-Final Office Action, U.S. App. No. 17/709,139, Dec. 17, 2024, 33 pages.

(Continued)

*Primary Examiner* — Jorge A Chu Joy-Davila
(74) *Attorney, Agent, or Firm* — Nicholson De Vos Webster & Elliott LLP

(57) ABSTRACT

Techniques are described for enabling computing devices in computing environments distinct from a cloud provider network to use temporally staggered container image pull requests upon initiating execution of a container-based task. For example, upon determining to launch a container on a computing device running in a computing environment that is distinct from a cloud provider network, an agent running on the computing device can select a time in the future at which to request the container image(s) to be used to launch the container from a container registry based on a randomized value. The randomized value, for example, can enable each computing device in the environment to request the container image(s) at a time that differs from times at which other computing devices in the environment generate similar requests (e.g., such that the request times are "staggered" relative to one another).

20 Claims, 10 Drawing Sheets

(56) References Cited

U.S. PATENT DOCUMENTS

| | | | |
|---|---|---|---|
| 12,135,627 B1 | 11/2024 | Sharma et al. | |
| 2006/0140119 A1 | 6/2006 | Yeh et al. | |
| 2008/0144493 A1 | 6/2008 | Yeh | |
| 2008/0192820 A1 | 8/2008 | Brooks et al. | |
| 2008/0250419 A1 | 10/2008 | Kasten et al. | |
| 2008/0288621 A1 | 11/2008 | Snell et al. | |
| 2009/0164565 A1 | 6/2009 | Underhill | |
| 2011/0302285 A1 | 12/2011 | D'Angelo et al. | |
| 2012/0087229 A1 | 4/2012 | Mantri | |
| 2013/0051300 A1 | 2/2013 | He et al. | |
| 2014/0173112 A1 | 6/2014 | Seago et al. | |
| 2017/0177046 A1 | 6/2017 | Garg et al. | |
| 2018/0137174 A1 | 5/2018 | Cahana et al. | |
| 2018/0234497 A1* | 8/2018 | Ueda | H04L 67/12 |
| 2018/0270079 A1 | 9/2018 | Chamarajnager et al. | |
| 2019/0098617 A1 | 3/2019 | Li et al. | |
| 2019/0391844 A1 | 12/2019 | Chen | |
| 2020/0233651 A1 | 7/2020 | Shantharam et al. | |
| 2021/0311758 A1 | 10/2021 | Cao et al. | |
| 2021/0314310 A1 | 10/2021 | Cao et al. | |
| 2021/0337014 A1 | 10/2021 | Cameron | |
| 2022/0019455 A1 | 1/2022 | Cao et al. | |
| 2022/0035626 A1 | 2/2022 | Kapoor et al. | |
| 2022/0229686 A1 | 7/2022 | Jain et al. | |
| 2022/0326930 A1 | 10/2022 | Nandavar et al. | |
| 2023/0068221 A1 | 3/2023 | Magowan et al. | |
| 2023/0155940 A1 | 5/2023 | Gore et al. | |
| 2024/0248742 A1 | 7/2024 | Frosi et al. | |

OTHER PUBLICATIONS

Notice of Allowance, U.S. App. No. 17/709,139, Jun. 24, 2025, 12 pages.

* cited by examiner

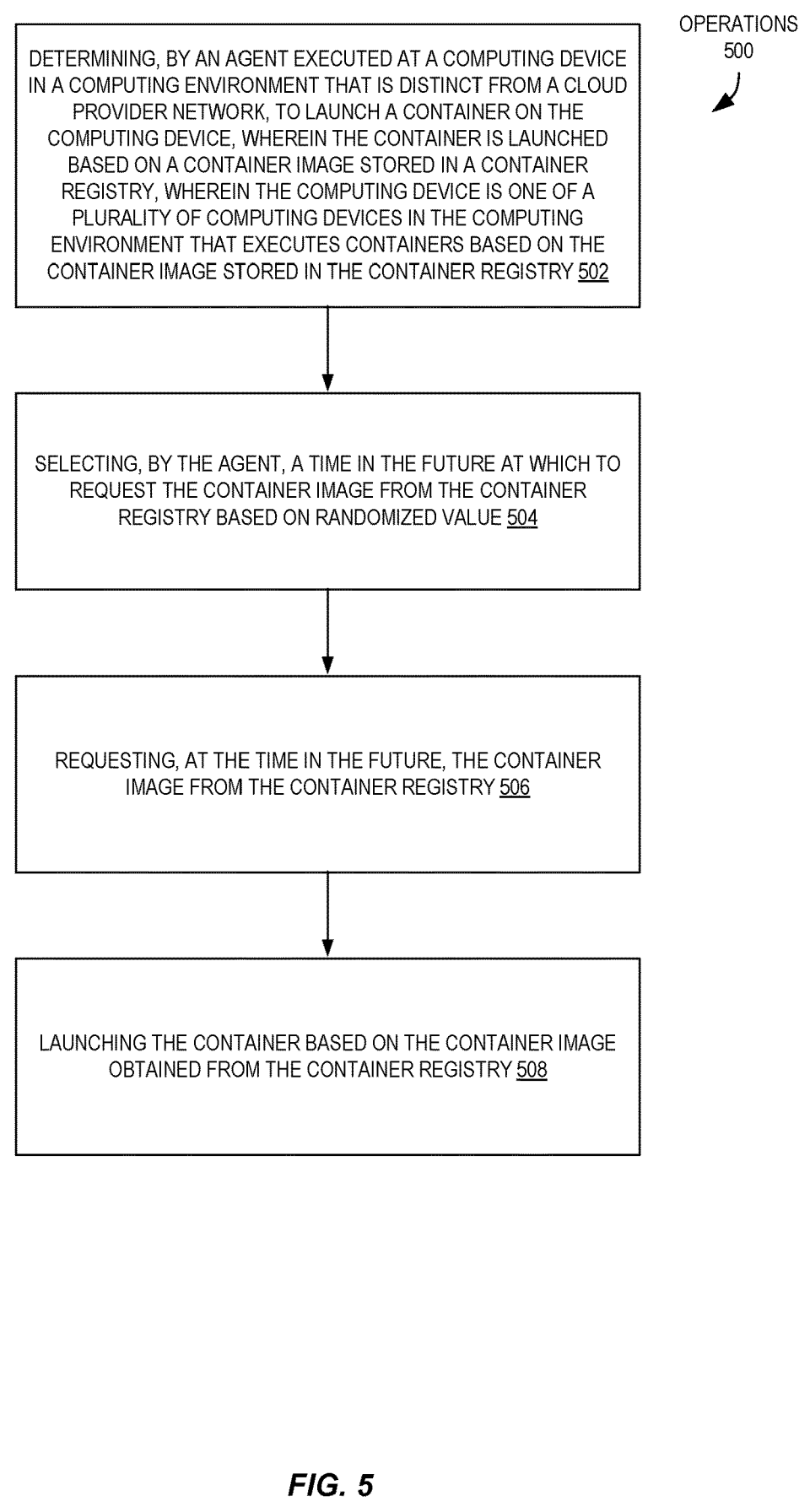

OPERATIONS
500

DETERMINING, BY AN AGENT EXECUTED AT A COMPUTING DEVICE IN A COMPUTING ENVIRONMENT THAT IS DISTINCT FROM A CLOUD PROVIDER NETWORK, TO LAUNCH A CONTAINER ON THE COMPUTING DEVICE, WHEREIN THE CONTAINER IS LAUNCHED BASED ON A CONTAINER IMAGE STORED IN A CONTAINER REGISTRY, WHEREIN THE COMPUTING DEVICE IS ONE OF A PLURALITY OF COMPUTING DEVICES IN THE COMPUTING ENVIRONMENT THAT EXECUTES CONTAINERS BASED ON THE CONTAINER IMAGE STORED IN THE CONTAINER REGISTRY 502

SELECTING, BY THE AGENT, A TIME IN THE FUTURE AT WHICH TO REQUEST THE CONTAINER IMAGE FROM THE CONTAINER REGISTRY BASED ON RANDOMIZED VALUE 504

REQUESTING, AT THE TIME IN THE FUTURE, THE CONTAINER IMAGE FROM THE CONTAINER REGISTRY 506

LAUNCHING THE CONTAINER BASED ON THE CONTAINER IMAGE OBTAINED FROM THE CONTAINER REGISTRY 508

*FIG. 5*

OPERATIONS
600

RECEIVING, BY A CONTROL PLANE OF A CLOUD PROVIDER NETWORK, FROM ONE OR MORE AGENTS EXECUTING IN A NETWORK THAT IS DISTINCT FROM THE CLOUD PROVIDER NETWORK, A PLURALITY OF REQUESTS TO PULL ONE OR MORE CONTAINER IMAGES FROM A CONTAINER REGISTRY HOSTED IN THE CLOUD PROVIDER NETWORK 602

DETERMINING, BY THE CONTROL PLANE, TO STAGGER PROVIDING THE ONE OR MORE CONTAINER IMAGES TO THE ONE OR MORE AGENTS EXECUTING IN THE NETWORK THAT IS DISTINCT FROM THE CLOUD PROVIDER NETWORK 604

SENDING, BY THE CONTROL PLANE TO THE ONE OR MORE AGENTS, INSTRUCTIONS TO OBTAIN THE ONE OR MORE CONTAINER IMAGES FROM THE CONTAINER REGISTRY, WHEREIN THE INSTRUCTIONS INCLUDE STAGGERED TIMES FOR THE ONE OR MORE AGENTS TO INITIATE REQUESTS TO THE CONTAINER REGISTRY 606

*FIG. 6*

OPERATIONS
700

RECEIVING, BY A CONTROL PLANE OF A CLOUD PROVIDER NETWORK, FROM AN AGENT EXECUTING IN A NETWORK THAT IS DISTINCT FROM THE CLOUD PROVIDER NETWORK, A REQUEST TO PULL A CONTAINER IMAGE FROM A CONTAINER REGISTRY HOSTED IN THE CLOUD PROVIDER NETWORK 702

DETERMINING, BY THE CONTROL PLANE, THAT A DIFFERENT REQUEST FOR THE CONTAINER IMAGE HAS BEEN RECEIVED FROM ANOTHER AGENT EXECUTING IN THE NETWORK THAT IS DISTINCT FROM THE CLOUD PROVIDER NETWORK 704

SENDING, BY THE CONTROL PLANE TO THE AGENT, INSTRUCTIONS TO OBTAIN THE CONTAINER IMAGE FROM A LOCAL CACHE LOCATED IN THE NETWORK THAT IS DISTINCT FROM THE CLOUD PROVIDER NETWORK 706

*FIG. 7*

LOCAL CONTAINER IMAGE CACHING AND RETRIEVAL FOR DEVICES AT EDGE LOCATIONS

BACKGROUND

Application containerization is a popular type of virtualization technology. Broadly speaking, containerization represents a type of operating system virtualization that allow users to run software applications and their dependencies in resource-isolated processes and in a consistent manner across different types of deployment environments. To enable container-based applications to run consistently across different deployment environments, a container is constructed as an atomic, self-contained package of software that includes everything needed to run the software contained therein (including, for example, any necessary code, libraries, packages, and so forth). The use of containers has become a popular application development and deployment tool in part because containers are often more portable, lightweight, standardized, and easier to deploy in a consistent manner compared to other types of application deployment strategies.

BRIEF DESCRIPTION OF DRAWINGS

Various examples in accordance with the present disclosure will be described with reference to the drawings, in which:

FIG. 5 is a flow diagram illustrating operations of a method for optimizing the retrieval of container images by container instances running on computing infrastructure external to a cloud provider network using temporally staggered container image pull requests according to some embodiments.

FIG. 6 is a flow diagram illustrating operations of a method for a control plane of a cloud provider network to optimize the retrieval of container images by container instances running on computing infrastructure external to a cloud provider network according to some embodiments.

FIG. 7 is a flow diagram illustrating operations of a method for optimizing the retrieval of container images by enabling container instances running in a computing environment that is distinct from a cloud provider network to pull container images from local caches according to some embodiments.

DETAILED DESCRIPTION

Figure 1:
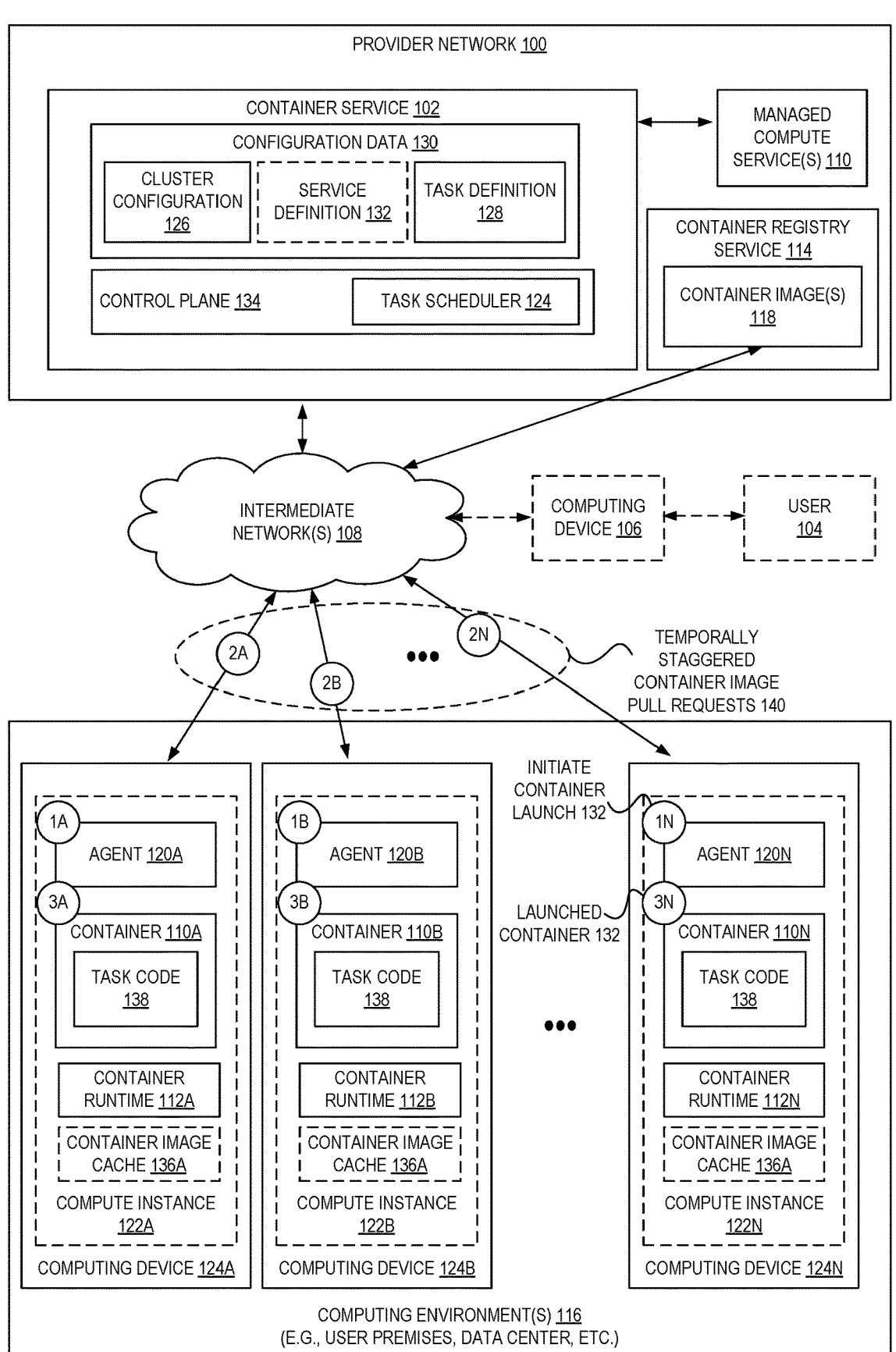
FIG. 1 is a diagram illustrating an environment for optimizing the retrieval of container images by container instances running on computing infrastructure external to a cloud provider network using temporally staggered container image pull requests according to some examples.

The present disclosure relates to methods, apparatus, systems, and non-transitory computer-readable storage media for optimizing the retrieval of container images by computing devices running on computing infrastructure external to a cloud provider network using temporally staggered container image pull requests. For example, some cloud service providers provide container services that enable the deployment of container instances managed by a control plane of a provider network but that execute in a computing environment that is distinct from the provider network (e.g., in a storefront, factory, office building). In some cases, these computing devices may attempt to initiate execution of a same container-based application (sometimes referred to as a "task" or "service") near in time to another, e.g., when the devices are initially powered on or restart, perhaps due to software or hardware issues, power issues, notification of the availability of a container image update, or the like.

When computing devices in these and other environments launch a container-based application, a significant portion of the application startup time is often spent downloading (or "pulling") the container image(s) to be used to run the task from a container registry. For example, some cloud provider networks provide container registry services where users can easily store, share, and deploy container images at their computing devices on demand. In those cases where a large portion of those devices attempt to initiate execution of a task near in time to one another, the devices may all at once attempt to pull the container image(s) from such a container registry service. The concurrent requesting and downloading of the container images can strain the local networks in which the devices operate, particularly in deployment settings that potentially lack high bandwidth network connections to all devices. The network congestion caused by such events can cause network instability and increase the amount of time taken to initiate the tasks on the computing devices collectively.

These challenges, among others, are addressed by enabling such computing devices to use temporally staggered container image pull requests upon initiating execution of a container-based task. For example, upon determining to launch a container on a computing device running in a computing environment that is distinct from a cloud provider network, an agent running on the computing device can select a time in the future at which to request the container image(s) to be used to launch the container from a container registry based on a randomized value. The randomized value, for example, can enable each computing device in the environment to request the container image(s) at a time that differs from times at which other computing devices in the environment generate similar requests (e.g., such that the request times are "staggered" relative to one another). In some examples, other local caching options are described to minimize the amount of remote container image pulls needed in such environments. Among other benefits, this ability to stagger container image pull requests and task launches enables large numbers of computing devices in a computing environment to initiate execution of containers near in time to one another without overwhelming the available network resources, thereby reducing the likelihood of container launch failures and other issues.

FIG. 1 is a diagram illustrating an environment for optimizing the retrieval of container images by container instances running on computing infrastructure external to a cloud provider network using temporally staggered container image pull requests according to some examples. A provider network 100 (or, "cloud" provider network) provides users with the ability to use one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc.

These and other computing resources can be provided as services, such as a hardware virtualization service that can execute compute instances, a container service 102 that can orchestrate the deployment and execution of containers, a storage service that can store data objects, etc. The users (or "customers") of provider networks 100 can use one or more user accounts that are associated with a customer account, though these terms can be used somewhat interchangeably depending upon the context of use. Users (e.g., a user 104) can use computing devices (e.g., a computing device 106) interact with a provider network 100 across one or more intermediate networks 108 (e.g., the internet) via one or more interface(s), such as through use of application programming interface (API) calls, via a console implemented as a website or application, etc. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. The interface(s) can be part of, or serve as a front-end to, a control plane of the provider network 100 that includes "backend" services supporting and enabling the services that can be more directly offered to customers.

For example, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network can be formed as a number of regions, where a region is a geographical area in which the cloud provider clusters data centers. Each region includes multiple (e.g., two or more) availability zones (AZs) connected to one another via a private high-speed network, for example a fiber communication connection. An AZ (also known as a "zone") provides an isolated failure domain including one or more data center facilities with separate power, separate networking, and separate cooling from those in another AZ. A data center refers to a physical building or enclosure that houses and provides power and cooling to servers of the cloud provider network. Preferably, AZs within a region are positioned far enough away from one another so that a natural disaster (or other failure-inducing event) should not affect or take more than one AZ offline at the same time.

Users can connect to an AZ of the cloud provider network via a publicly accessible network (e.g., the Internet, a cellular communication network), e.g., by way of a transit center (TC). TCs are the primary backbone locations linking users to the cloud provider network and can be collocated at other network provider facilities (e.g., Internet service providers (ISPs), telecommunications providers) and securely connected (e.g., via a VPN or direct connection) to the AZs. Each region can operate two or more TCs for redundancy. Regions are connected to a global network which includes private networking infrastructure (e.g., fiber connections controlled by the cloud provider) connecting each region to at least one other region. The cloud provider network can deliver content from points of presence (or "POPs") outside of, but networked with, these regions by way of edge locations and regional edge cache servers. This compartmentalization and geographic distribution of computing hardware enables the cloud provider network to provide low-latency resource access to users on a global scale with a high degree of fault tolerance and stability.

Generally, the traffic and operations of a provider network can broadly be subdivided into two categories: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes user resources that are implemented on the provider network (e.g., computing instances, containers, block storage volumes, databases, file storage). Data plane traffic generally includes non-administrative operations, such as transferring user data to and from the user resources. The control plane components are typically implemented on a separate set of servers from the data plane servers, and control plane traffic and data plane traffic can be sent over separate/distinct networks.

To provide these and other computing resource services, provider networks 100 often rely upon virtualization techniques. For example, virtualization technologies can provide users the ability to control or use compute resources (e.g., a "compute instance," such as a VM using a guest operating system (O/S) that operates using a hypervisor that might or might not further operate on top of an underlying host O/S, a container that might or might not operate in a VM, a compute instance that can execute on "bare metal" hardware without an underlying hypervisor), where one or multiple compute resources can be implemented using a single electronic device. Thus, a user can directly use a compute resource (e.g., provided by a hardware virtualization service) hosted by the provider network to perform a variety of computing tasks. Additionally, or alternatively, a user can indirectly use a compute resource by submitting code to be executed by the provider network (e.g., via an on-demand code execution service), which in turn uses one or more compute resources to execute the code—typically without the user having any control of or knowledge of the underlying compute instance(s) involved.

In some examples, a provider network 100 can provide a managed compute service 110 such as an on-demand code execution service (referred to in various examples as a function compute service, functions service, cloud functions service, functions as a service, or serverless computing service) that can enable users of the provider network 100 to execute their code on cloud resources without having to select or manage the underlying hardware resources used to execute the code. For example, a user can use the on-demand code execution service by uploading their code and use one or more APIs to request that the service identify, provision, and manage any resources required to run the code, such as virtual machines, containers, etc. The on-demand code execution service itself may make use of another managed compute service 110, such as a hardware virtualization service, to execute this code.

In some examples, a provider network 100 can provide a managed compute service 110 such as a hardware virtualization service (referred to in various implementations as an elastic compute service, a virtual machines service, a computing cloud service, a compute engine, or a cloud compute service) that enables users of the provider network 100 to provision and manage compute resources such as virtual machine instances. As is indicated herein, virtual machine technology can use one physical server computing device to run the equivalent of many servers (each of which is called a virtual machine), for example using a hypervisor, which can run at least on an offload card of the server (e.g., a card connected via PCI or PCIe to the physical CPUs) and other components of the virtualization host can be used for some virtualization management components. Such an offload card of the host can include one or more processors (e.g., CPUs) that are not available to user instances, but rather are dedicated to instance management tasks such as virtual machine management (e.g., a hypervisor), input/output virtualization to network-attached storage volumes, local migration management tasks, instance health monitoring, and the like). Virtual machines are commonly referred to as compute instances or simply "instances." As used herein, provisioning a virtual compute instance generally includes reserving resources (e.g., computational and memory resources) of an underlying physical compute instance for the client (e.g., from a pool of available physical compute instances and other resources), installing or launching required software (e.g., an operating system), and making the virtual compute instance available to the client for performing tasks specified by the client.

As introduced earlier, a container service 102 (referred to in various implementations as a container service, cloud container service, container engine, or container cloud service), such as the Amazon Elastic Container Service (ECS) (TM), can be a highly scalable, high performance container management service that supports containers (e.g., Docker containers) and allows users to easily run applications on a managed cluster of compute instances, eliminating the need for users to install, operate, and scale their own cluster management infrastructure. With simple API calls, users can launch and stop container-enabled applications, query the complete state of their clusters, and/or utilize provider network features such as virtual firewalls, load balancing, virtual block storage volumes, and/or Identity Access Management (IAM) roles. Users can use the container service 102 to schedule container placement across a cluster based on their unique resource needs and availability requirements or can integrate their own schedulers or third-party schedulers to meet business or application specific requirements.

At a high level, containers are a method of operating system virtualization that allow users to run an application and its dependencies in resource-isolated processes in a consistent manner across different deployment environments. To enable container-based applications to run consistently across various deployment environments, containers are constructed as atomic, self-contained packages of software that include everything needed to run the software contained therein—thus, a container can include any necessary code, runtime, libraries, packages, and so forth. The use of containers has become a popular application development and deployment tool at least in part because containers are generally portable, lightweight, standardized, and easy to deploy in a consistent manner regardless of deployment environment.

Containers can be created based on a read-only template called a container image. A container image is a standalone, executable package of software that includes everything needed to run an application process: code, runtime, system tools, system libraries and settings. Container images become containers at runtime. Container images are typically built from a plaintext file (e.g., a Dockerfile) configured by a user that specifies the components that are to be included in the container. After being built, the container images can be stored in a registry where they then can be downloaded and run. As is known to those of skill in the art, a container image can be executed by a container runtime 112, which can be installed at a host operating system, leading to the instantiation of a container. Depending on the format of the container image, any of a number of available container runtimes can be used including, for example, container runtimes provided by the Docker® or other container platforms. A container image can generally be treated as read-only data by a container runtime. Containers are thus an abstraction of the application layer (meaning that each container simulates a different software application process). Though each container runs isolated processes, multiple containers can share a common operating system, for example by being launched within the same virtual machine. In contrast, virtual machines are an abstraction of the hardware layer (meaning that each virtual machine simulates a physical machine that can run software). While multiple virtual machines can run on one physical machine, each virtual machine typically has its own copy of an operating system, as well as the applications and their related files, libraries, and dependencies.

In some examples, a provider network 100 provides a container registry service 114 enabling users to store, share, and deploy container software to computing devices located in virtually any computing environment (including, e.g., a computing environment 116). The container registry service 114 enables users to push container images to the registry (e.g., stored as container image(s) 118) and to pull images using any management tool, thereby enabling users to deploy containers reliably across any number of computing devices. In some examples, the container registry service 114 transfers container images using secure communication protocols (e.g., HTTPS) and automatically encrypts the images at rest. Users can also configure policies to manage permissions for their repositories and to optionally restrict access to specific users, roles, and accounts.

To prepare an application to be run using the container service 102, in some examples a user can define or provision a cluster, create a task or service definition, and provide associated configuration data that the container service 102 can use to manage the execution of user's application. A cluster is a logical grouping of execution resources that can be used to execute one or multiple tasks or services. A user can register one or more compute resources (e.g., compute instances such as virtual machines, physical computing devices, etc.) as being associated with a cluster and thus become available for use to run "tasks" upon. A compute instance can be used somewhat synonymously with the term "container instance," though the latter can refer more specifically to an execution resource (e.g., a compute instance or physical host) that is running a container agent 120, has a container runtime 112A-112N installed, and has been registered into a cluster. In some examples, container instances can be hosted within the provider network 100, such as via use of one or more managed compute services 110.

However, in some examples, a container service 102 provides support for registering "external instances" to a cluster that execute in a separate computing environment 116 (e.g., at a premises of an organization) that is distinct from the provider network 100 and that thus is part of a user-managed compute environment, where the user may be a customer of the provider network or a third party. These external container instances can be in the form of a server computing device (e.g., computing device 124A) or virtual machine (e.g., compute instance 122A), and can be particularly useful for running applications that generate outbound traffic or process data, though external instances can also easily support services that actively process inbound traffic.

Thus, via a console application (e.g., a web-based application or custom application) or API, a user 104 can utilize a computing device (e.g., computing device 106) to send commands to the container service 102 (e.g., a "create-cluster" type command) to create or configure a cluster and to associate container instances with the cluster. Metadata provided by the user in the command(s) or generated by the container service 102 can be stored as cluster configuration data 126, for example, a cluster name, identifiers of networking information associated with the cluster such as a subnet or private network that they operate within, tags associated with the cluster, operational configurations such as associated services-like monitoring, auto-scaling, etc.-to be enabled for the cluster, etc.

In some examples, the user can have installed a container agent 120 upon each compute instance or computing device (to qualify it as a "container instance" available for assignment into a cluster), or the particular compute instance or computing device can be pre-allocated with a container agent 120 by the container service 102 (e.g., by launching a virtual machine compute instance using a machine image having the agent thereupon). Alternatively, or additionally, a new compute instance can be deployed and/or configured as a container instance when being added to a cluster, such as via the user submitting a command to both obtain a compute instance (e.g., from a managed compute service 110) and add it to the cluster.

A cluster of container instances can thus be used to execute some portion of application code, referred to herein as a "task." Thus, the term "task" is generally used in a broad manner to refer to a set of computing operations of some type associated with an application. For example, in some examples, a "task" can be a portion of a software application (or the entirety of the application) that is to be run using one or more containers. A user 104 may, in some examples, issue one or more commands (e.g., a "register-task-definition" command) to create a task definition 128 representing a portion of an application the user wishes to run, which can be stored as part of configuration data 130 as task definition 128.

For example, the user 104 can specify parameters to be part of a task definition 128 such as an identifier of a container image to use with each container in the task, amounts and/or types of computing resources (e.g., CPU, memory) to use with each task or each container within a task, a launch type to use that identifies the infrastructure on which the tasks are hosted (e.g., a hardware virtualization service, an on-demand serverless execution service, an "external" launch type indicating that the task is to be run on an external container instance that is remote from the service provider network), a logging configuration to use for the tasks, an indicator of whether the task should continue to run if the container finishes or fails, a command that the container should run when it is started, identifiers of any data volumes that should be used with the containers in the task, an IAM role that the tasks should use, etc. In some examples, a user can define (or include) one or multiple containers in a single task definition. However, a user's entire application stack does not need to be on within a single task definition, and instead the application can span multiple task definitions where the user combines related containers into their own task definitions, each representing a single component of the application.

Accordingly, in some examples, a task definition can be text (e.g., in JavaScript Object Notation (JSON) format) that describes one or more containers that form an application. The task definition can be thought of as a blueprint for the application as it specifies various parameters for the application, which can indicate which containers should be used, which ports should be opened for the application, what data volumes should be used with the containers in the task, etc. The specific parameters available for a task definition depend on the needs of the specific application. A "task instance" (or just "task") can thus represent the instantiation of a task definition within a cluster. After a user has created a task definition for an application, the user can specify the number of tasks to run on the cluster.

Similarly, users can provide configuration data to define services as part of a service definition 132, where a service is an abstraction related to long running applications that allows the user to run and maintain a specified number of instances of a task definition simultaneously. Thus, if any of the tasks of a cluster should fail or stop for any reason, the container service can launch another instance of the task definition to replace it in order to maintain the desired number of tasks in the service. In some examples, a service can also run behind a load balancer that distributes request traffic across the tasks that are associated with the service.

With this configuration data 130, a container task scheduler (of the control plane 134 of the container service 102) is responsible for placing tasks within a cluster. There are several different scheduling options that can be used, for example, a user can define a service that runs and maintains a specified number of tasks simultaneously.

As described herein, a container agent 120A-120N can be a software module that runs on each compute instance 122 within a cluster and can send information to the control plane about the instance's current running tasks, resource utilization amounts (e.g., CPU, memory, networking), etc., and can start and stop tasks whenever it receives a request to do so from the control plane. In some examples, a container agent can optionally cache container images in a local container image cache 136. Thus, it can perform local actions under the control of the control plane 134 (e.g., responsive to commands sent by the control plane or configurations initiated from the control plane) and can report back metadata to the control plane 134 or a separate monitoring or logging service of the provider network 100.

As indicated herein, in some examples a user 104 can run tasks using a cluster of container instances in the form of compute instances 122A-122N and/or computing devices 124A-124N (e.g., Point of Sale (POS) devices) executing at a computing environment 116 at a separate physical location (or set of locations) than that of the provider network 100, such as at a storefront, factory, corporate office, distribution center, data center, or the like. However, one issue with these locations (as compared to provider network 100 locations) is that the network bandwidth available to such instances is often comparatively limited, particularly when taking into account the amount communication between the devices in such locations and the provider network 100 to obtain task information, obtain container images from a container registry service 114, and the like.

For example, in some implementations, when a compute instance is launched or a computing device is started up, it executes an agent 120 that will attempt to contact or "check in" with the (remote) control plane 134 of the container service 102, for example, to determine which, if any, tasks it should be executing and to obtain container image(s) to run from a container registry service 114. Notably, by design, in many systems this information is purposefully not physically stored locally at the computing device itself due to the device not having available or sufficient non-volatile storage, the task no longer needing to be run, security considerations, or the like. Instead, the logically centralized control plane 134 is designed to manage the task execution across various instances of a cluster in a more synchronous and ongoing manner.

However, in events where many devices within a computing environment 116 attempt to initiate execution of a task near in time to one another, each of the agents 120 may simultaneously attempt obtain the task code 138 (e.g., a container image that can be launched to run the task, a set of instructions, an executable, etc.) from the provider network or other remote location (e.g., from a container registry service 114). The simultaneous requesting and downloading can cause issues in bandwidth-constrained computing environments, as described above. This can cause issues as these tasks can need to be operational as soon as possible (e.g., the tasks can implement functionality for a retail POS system that needs to be actively utilized).

According to examples described herein, a set of agents 120A-120N deployed as part of a cluster of instances 122N-122Z can each include logic enabling these agents to temporally stagger container image pull requests in cases such as restarts, container image update notifications, and other scenarios in which the agents within a computing environment 116 attempt to start tasks near in time to one another. For example, at circles "1A", "1B", . . . , "1N", each of devices determine to start a task. As indicated above, an agent 120 can determine to start a task based on instructions received from a container service 102, based on a task definition stored at the device, or based on other events. In some examples, the task or service definition used by the agent can identify one or more container images stored in a container registry (e.g., a container registry service 114) hosted within a cloud provider network 100. As illustrated in FIG. 1, such a computing device generating a request for a container image can be one among any number of other computing devices running in the same computing environment 116.

In some examples, rather than each agent immediately requesting any container image(s) identified by a task or service definition from the container registry service 114, each of the agents 120 selects a time in the future at which to request the container image(s). For example, the time in the future selected by a particular agent can be based on a randomized value used to temporally stagger a time at which each of the agents 120 generates a request. In FIG. 1, for example, each of the computing devices 124A-124N initiates execution of a task near in time to one another and each selects a respective time at which to request a container image from the container registry service 114 (where each computing device 124 may be requesting the same container image(s) or an overlapping set of container images). The randomized value can be used to select a time within a future time window (e.g., in the next 5, 10, or 30 minutes, or any other span of time) such that, e.g., agent 120A might determine wait twenty seven (27) seconds to request its container images from the container registry service 114, computing device 124B determines to wait three (3) seconds, computing device 124N determines to wait two (2) minutes, and the like.

Thus, as shown in circles "2A," "2B," . . . , and "2C," each of the devices sends a temporally staggered container image pull request 140 at a different time compared to other devices. It is noted that, in some examples, there may not be any explicit coordination between the agents 120 when selecting a randomized time at which to generate its container image pull request and thus some devices may send requests at the same time or near in time to one another. However, in general, the use of the randomly selected times by the agents 120 distributes the container image pull requests across a span of time rather than all devices sending the requests at the same time, thereby reducing the likelihood of severe network congestion due to such requests.

In some examples, at circles "3A," "3B", . . . , and "3N," once the requested container image(s) are downloaded from the container registry service 114, each of the agents 120 launches one or more containers at a respective computing device 124 according to the relevant task or service definition. In some examples, the agents 120 further optionally cache the obtained container image(s) in a container image cache 136 for subsequent launches In the example illustrated above, each of the agents 120 running on the computing devices shown in FIG. 1 selected a time in the future at which to request container images from the container registry service 114 based on a randomized value used to generate a randomly selected time in the future. In other examples, an agent 120 can use other algorithms and data to select a time at which to generate a container image pull request. As one example, an agent 120 can select a time in the future at which to request a container image as part of a container launch process based at least in part on a network quality measurement obtained by the agent (e.g., a measurement indicating a current amount of network bandwidth available, current network speeds, or current network congestion levels). In this example, an agent can select a time nearer or farther in the future based on the current network conditions. In other examples, an agent 120 can select a time in the future at which to request one or more container images based at least in part on one or more of: a size of the container image(s) to be downloaded (e.g., such that the span of time in which the request time is selected is larger for larger container images), a historical frequency with which the agent pulls the container image(s) from the container image registry service 114, or the like.

As indicated, in some examples, once a computing device obtains one or more container images used by the computing device to launch containers in a computing environment 116, the computing device can optionally cache those container image(s) locally in a container image cache 136 for subsequent container launches. For example, the caching of container images locally can be a configuration included as part of a task or service definition used by an agent to launch containers on one or more devices. However, the container images used by the computing devices may be updated periodically, e.g., to fix bugs, add new features, and the like. Thus, it is desirable for the computing devices to be able to periodically check for or receive indications of container image updates such that each device can launch containers using a latest available image when possible.

In some examples, some or all the processes described above for enabling agents in a computing environment 116 to stagger pulling container images can be coordinated by a control plane of the provider network 100. As an example, a control plane of the provider network (e.g., the control plane 134) receiving a plurality of requests, from one or more agents executing in a computing environment 116, to pull one or more container images from a container registry service 114 can determine to stagger providing the set of container images to the one or more agents. As indicated herein, the one or more agents sending the requests might send the requests near in time to another because the agents all started execution near in time to one another, all received an indication of an update to one or more container images near in time to another, or for other reasons. The control plane can identify multiple agents in a computing environment 116 that are requesting one or more container images near in time to another, for example, by aggregating requests sent within defined time windows (e.g., by storing requests in a buffer or other data structure for a limited period of time) and analyzing the requests for those originating from a same computing environment. In some examples, the control plane can aggregate only those requests originating from a same computing environment 116 in a same buffer, e.g., such that the control plane can analyze requests from a same environment or, in other examples, a single buffer can be used with indicators of an originating environment for each request.

In some examples, responsive to determining that the control plane has received two or more requests for a same container image, the control plane can send instructions to obtain the set of container images from the container registry, where the instructions include staggered times for the one or more agents to initiate request to the container registry. For example, the staggered times can be used to cause the agents in a computing environment 116 to re-initiate requests for the same container image or images at staggered times relative to one another. In this example, each of the agents receiving the instructions from the control plane can wait to re-send a request for the container image at a time indicated in the instructions sent specifically to that agent. In this manner, the use of network resources in the computing environment 116 can be spread across time instead of multiple agents downloading container images more concurrently. Similar to above, the control plane can select the staggered times based on at least one of: a size of the one or more container images, historical download speeds, a number of agents in the network that is distinct from the cloud provider network, a frequency with which the one or more agents pull the one or more container images from the registry, or a measurement obtained by the control plane reflecting current network performance in the computing environment. For example, the measurement obtained by the control plane reflecting current network performance in the computing environment can be obtained from one or more of the agents running in the environment, or obtained by the control plane from another source and reflecting the performance of any network links in between the cloud provider network and the agents.

Figure 2:
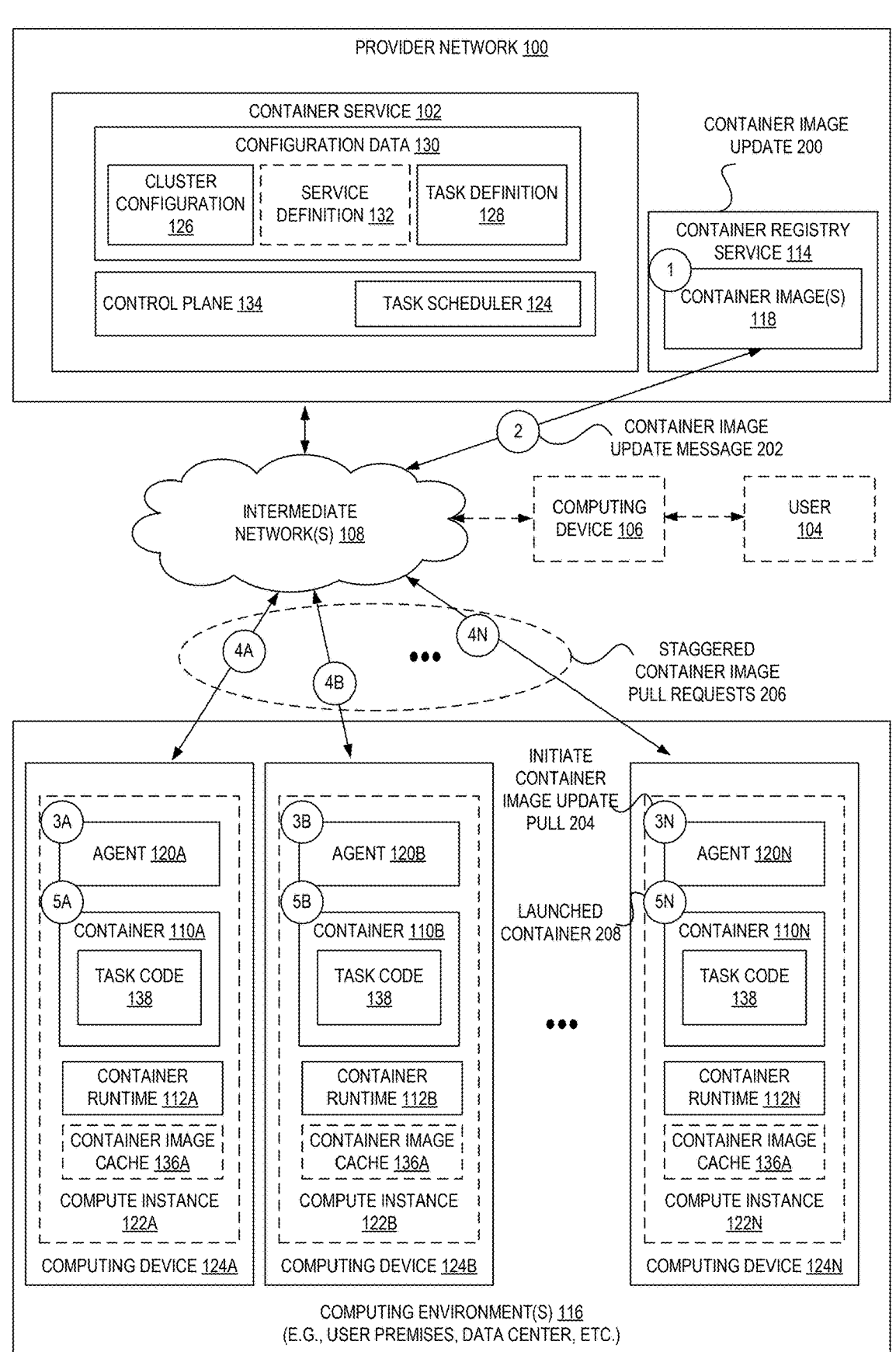
FIG. 2 is a diagram illustrating event-driven retrieval of container image updates by container instances running on computing infrastructure managed external to a provider network according to some examples.

FIG. 2 is a diagram illustrating event-driven retrieval of container image updates by container instances running on computing infrastructure managed external to a provider network according to some examples. As shown in FIG. 2, at some point in time, a container image update 200 is pushed to the container registry service 114. For example, the container image update 200 may be pushed to the container registry service 114 by a developer or other user that has updated the code or other artifacts associated with a container image 118.

In some examples, computing devices in a computing environment 116 can be notified of container image updates using a publish-subscribe messaging system where, once the container registry service 114 determines that an update to a container image 118 is available, the service can publish an event (e.g., a container image update message 202) to a message queue associated with the container image or cluster indicating that a new version of the image is available. In this example, any agent 120 listening to those events (e.g., any agent 120 with a task or service definition identifying the container image) can obtain the message 202, thereby causing the agent to pull the updated container image from the container registry service 114 for use. In other examples, the agents 120 can periodically query the container registry service 114 for such updates.

In the example of FIG. 2, each of the agents 120A-120N obtains the container image update message 202 and, at circles "3A," "3B," . . . , and "3N" initiates 204 process to pull the container image update(s) from the container registry service 114. Similar to FIG. 1, the agents 120A, 120B, . . . , and 120B can each select a respective time at which to send a container image pull request based on a randomized value or using any other process described herein. As shown, the selection of the respective times results in temporally staggered container image pull requests 206 at circles "4A," "4B," . . . , and "4N" to the container registry service 114. Once obtained by each of the computing devices, at circles "5A," "5B," . . . , through "5N", the agents 120 launch 208 the containers based on the updated container images. Again, the use of the staggered container image pull requests 206 enables the container service 102 to provide an update to one or more container image(s) used by the devices in the computing environment 116 without overwhelming the network resources.

Figure 3:
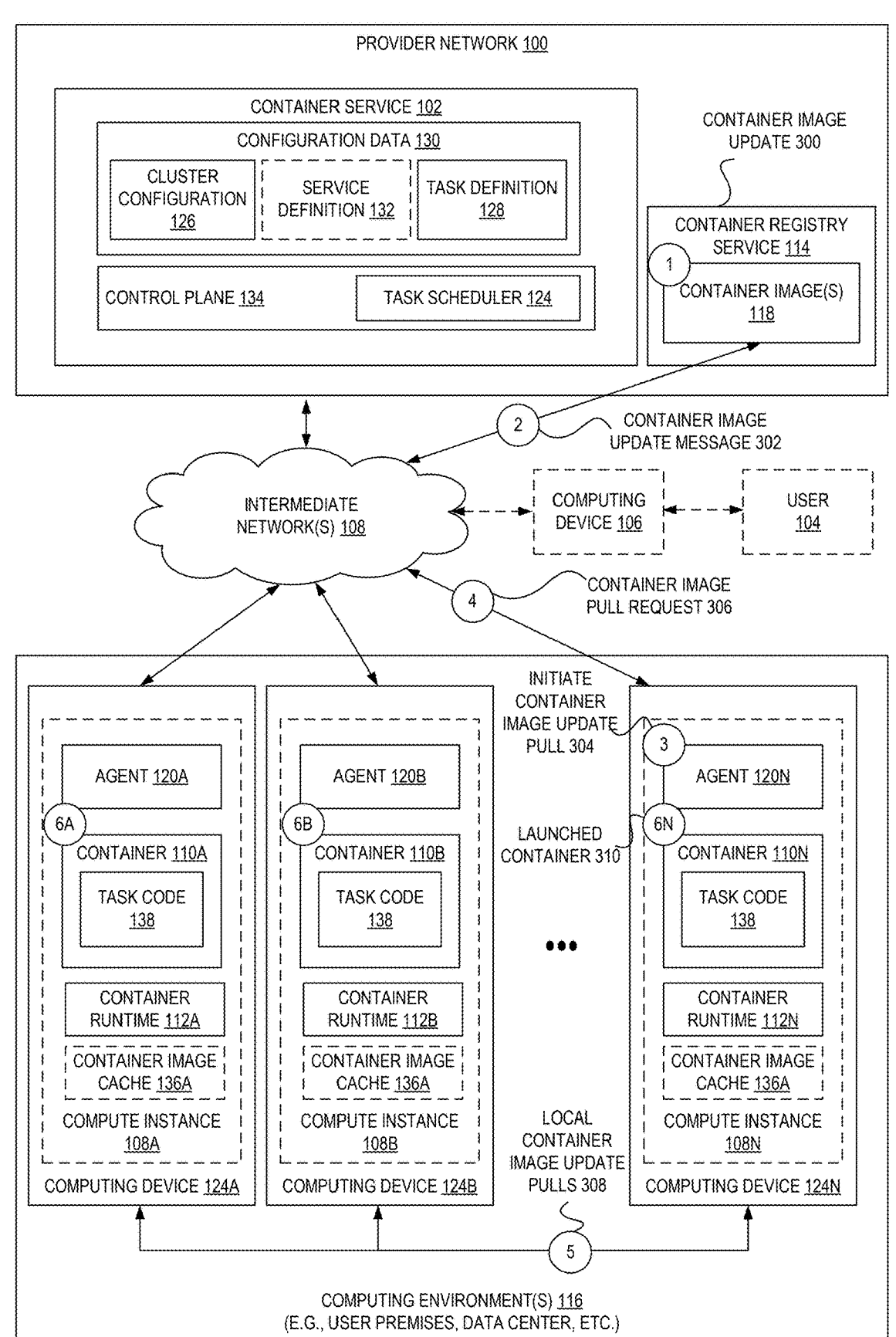
FIG. 3 is a diagram illustrating the use of an elected image container cache among container instances running on infrastructure managed outside of a provider network according to some examples.

FIG. 3 is a diagram illustrating the use of an elected image container cache among container instances running on infrastructure managed outside of a provider network according to some examples. In FIG. 3, rather than each computing device obtaining one or more container images upon initial launch or responsive to container image updates, the computing devices in an environment can elect one or more primary devices to obtain container image(s) from a remote container registry service 114 and then the remaining devices obtain the images from a local cache provided by the primary device. In this manner, only a small number of devices in the computing environment 116 may need request and download the container image(s) from the remote registry service 114 and local resources can be used to distribute the container image(s) throughout the computing environment 116 or other devices.

For example, the control plane 134 can configure one or multiple agents 120 of container instances with configuration information that allows each agent 120 to perform limited control plane functionalities, thus forming something akin to a support mesh. The configuration information can include, for example, an identifier of another agent (or container instance), together with information indicating what tasks the agent is to be performing, such as an identifier of a particular task resource (e.g., container image, application, function, etc.) that agent is to utilize. Thus, the configuration information can include a mapping between an identifier of another agent and the task(s) it is performing. The configuration information can be stored in a variety of formats, such as in a lookup table, a formatted text file (e.g., a CSV or TSV), database, or the like, allowing for relatively rapid lookups.

In some examples, the configuration information can further include priority or backup type information indicating when and how that configured agent (e.g., agent 120A) is to act as a primary container cache with respect to another particular agent (e.g., agent 120N) that may use one or more same container images. For example, the control plane 134 can configure a more "nearby" agent (e.g., one that executes on a same computing device 124, same rack, in a same room or building, in a same local network segment, etc.) to serve as a more primary/immediate backup while having a more remote agent (or agents) be configured as secondary backup agents—this can allow for agents to obtain container image(s) from a more proximate device on the network.

The configuration information, in some examples, includes an ordering value (e.g., an integer or boolean) identifying an ordering in which that agent is to assume primary responsibility (or, attempt to assume responsibility) for acting as a container image cache for another agent vis-a-vis other agents in the cluster. For example, the value can be an integer indicating a ranking (e.g., first, second) in which the agent is to serve as a container image cache. Thus, in the event of determining that a task instance launch is to occur, or that an update 300 to a container image is available (e.g., as shown in circles "1" and "2" of FIG. 3 and based on the devices receiving a container image update message 302), an agent with an ordering value of "1" can be the first to obtain the container image update from the container registry service 114 (e.g., shown as circle "3" with the initiation of a container image update pull 304 and the container image pull request 304 at circle "4"). Whereas if it has an ordering value of "2," the agent can wait for another agent to obtain the container image, and upon an amount of time passing, and obtain the container images using local container image update pulls 308 at circle "5" in FIG. 3. In some examples, the ordering value can be a boolean (e.g., 1 or true meaning the agent is to be a primary container image caching agent and 0 or false meaning the agent is to be a secondary agent) or another type of data value that conveys to the agent if and when it should act as a primary container image caching agent.

Thus, for example, the configuration information for an agent 120N might include two entries, where each entry identifies an ordering value, an identifier of another agent, and an identifier of a task resource associated with the other agent. Thus, a first entry of (1, 120A, "container image 1") indicates that agent 120N is to be the primary container image cache (via the first ordering value of "1") for agent 120A (via the second value, which can in reality be a hostname, network address, or the like) and that this agent 120N is to be executing a task via use a particular set of task resources (e.g., a container image that can be launched). In general, any scheme can be used by the control plane 134 to indicate to the agents in a computing environment 116 which other agents are to serve as primary container image caches for particular container image(s) depending, for example, on agents that share common task or service definitions, task or service definition dependencies, and the like.

In some examples, rather than electing an agent to act as a primary agent for obtaining one or more container images from a container registry service 114, a control plane of the cloud provider network 100 can identify instances of multiple agents in an external computing environment requesting one or more same containers from a container registry service 114 and send instructions to some of the agents to obtain containers from a source local to the external computing environment (e.g., from a container image cache associated with another agent, or from a separate local cache hosted in the environment).

As an example, a control plane of the provide network 100 can receive, from agents executing in a computing environment 116, requests to pull a container image from a container registry service 114 hosted in the cloud provider network 100. In some examples, the control plane can store these requests in a buffer or other data structure that enables the control plane to determine whether the control plane will receive requests for a same one or more containers in some defined future window of time (e.g., within the next 10 seconds or other defined period). Responsive to receiving a request for a particular container image, the control plane can determine, based on the buffered requests, that multiple requests for a container image have been received from two or more agents executing in the network. In some examples, responsive to the determination, the control plane can send to the agent instructions to obtain the container image from a local cache located in the network (e.g., a local cache associated with another agent in the environment, which may be running on a same or different host within the environment). In other examples, the instructions can refer the agent to a local cache that is independent of any one of the agents in particular, e.g., a local registry cache.

Figure 4:
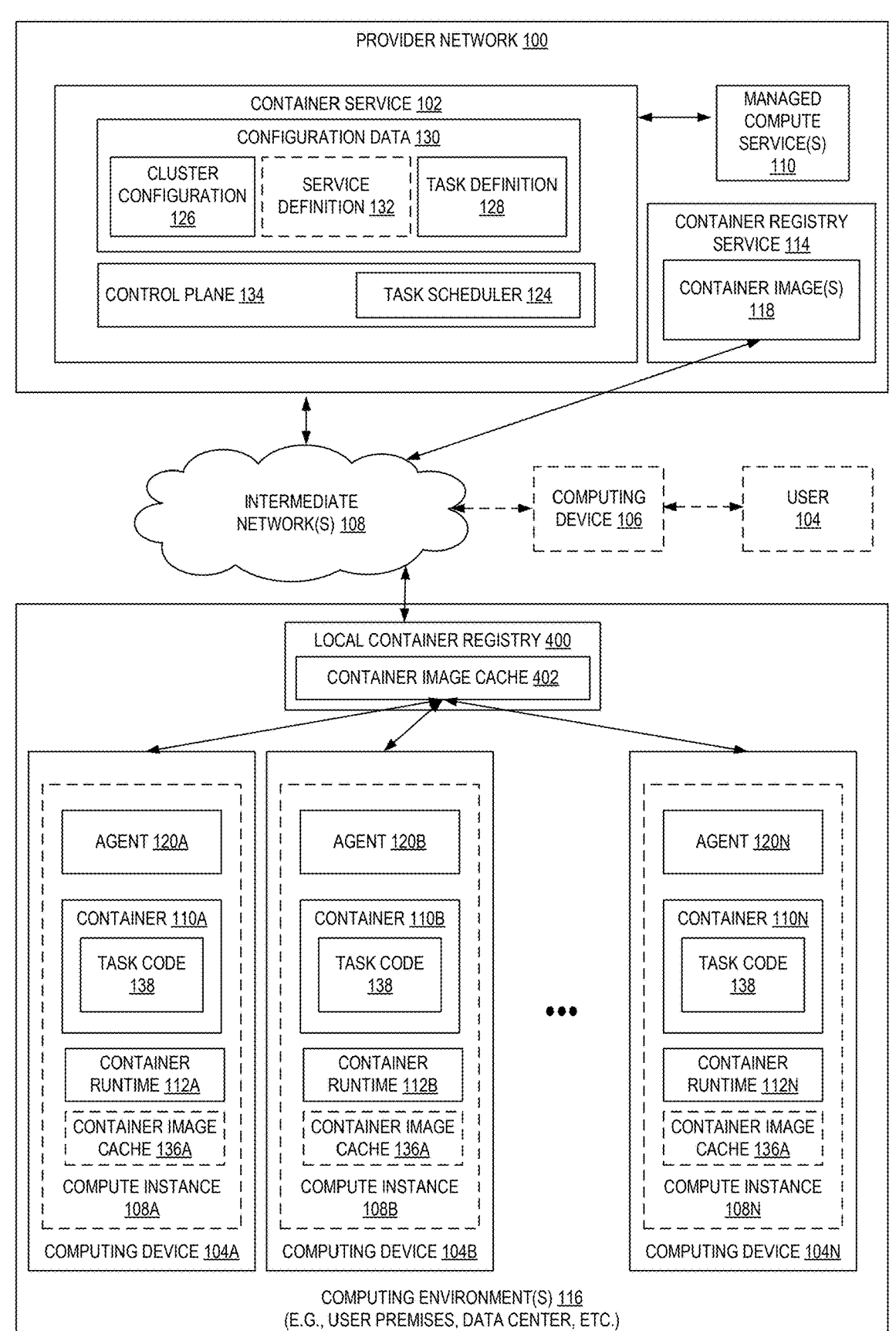
FIG. 4 is a diagram illustrating the use of a container registry cache accessible to container instances running on infrastructure managed outside of a provider network according to some examples.

In FIG. 3, one or more of the agents running on a computing device in the computing environment 116 is configured to act as primary container image cache for other devices. In other examples, a separate service can be configured within the environment 116 to act as a local cache of container image(s) 118 in the computing environment (e.g., to serve as a local version of the container registry service 114 for only those container image(s) relevant to the particular computing environment 116). FIG. 4 is a diagram illustrating the use of a local container registry cache accessible to container instances running on infrastructure managed outside of a provider network according to some examples. As shown in FIG. 4, in some examples, it may be possible to provision a local container registry 400 used to manage a local container image cache 402 of container images used by computing devices in a computing environment 116. In this example, the container service 102 can instruct the local container registry 400 to obtain container image(s) 118 from the container registry service 114 based on, e.g., the task and service definitions associated with one or more clusters registered in the computing environment 116.

FIG. 5 is a flow diagram illustrating operations 500 of a method for optimizing the retrieval of container images by container instances running on computing infrastructure external to a cloud provider network using temporally staggered container image pull requests according to some embodiments. Some or all of the operations 500 (or other processes described herein, or variations, and/or combinations thereof) are performed under the control of one or more computer systems configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some embodiments, one or more (or all) of the operations 500 are performed by an agent 120 of the other figures.

The operations 500 include, at block 502, determining, by an agent executed at a computing device in a computing environment that is distinct from a cloud provider network, to launch a container on the computing device, wherein the container is launched based on a container image stored in a container registry, wherein the computing device is one of a plurality of computing devices in the computing environment that executes containers based on the container image stored in the container registry.

The operations 500 further include, at block 504, selecting, by the agent, a time in the future at which to request the container image from the container registry based on randomized value.

The operations 500 further include, at block 506, requesting, at the time in the future, the container image from the container registry.

The operations 500 further include, at block 508, launching the container based on the container image obtained from the container registry.

In some examples, the time in the future is further selected based on at least one of a size of the container image, historical download rates, a number of devices in the computing environment, or a frequency with which the agent pulls the container image from the registry.

In some examples, the operations further include obtaining, by the agent, an indication from the container registry that an update to the container image is available at the container registry, where the agent selects the time in the future at which to request the container image from the container registry responsive to the indication that the update to the container image is available.

In some examples, the container registry executes on computing resources in the computing environment, and the container registry obtains the container image from a container registry service provided by the cloud provider network.

In some examples, the operations further include receiving, from a container service of the cloud provider network, a request to launch the container prior to the time in the future; and requesting the container image from the container registry prior to the selected time in the future.

In some examples, the operations further include storing, in a local container image cache, the container image; and relaunching the container based on the container image stored in the local container image cache.

In some examples, the operations further include the agent determines to launch the container based on a task or service definition obtained by the agent from a container service of the cloud provider network, and wherein the task or service definition includes an identifier of the container image.

FIG. 6 is a flow diagram illustrating operations 600 of a method for a control plane of a cloud provider network to optimize the retrieval of container images by container instances running on computing infrastructure external to a cloud provider network according to some embodiments. Some or all of the operations 600 (or other processes described herein, or variations, and/or combinations thereof) are performed under the control of one or more computer systems configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some embodiments, one or more (or all) of the operations 600 are performed by a control plane 134 of the other figures.

The operations 600 include, at block 602, receiving, by a control plane of a cloud provider network, from one or more agents executing in a network that is distinct from the cloud provider network, a plurality of requests to pull one or more container images from a container registry hosted in the cloud provider network.

The operations 600 further include, at block 604, determining, by the control plane, to stagger providing the set of container images to the one or more agents executing in the network that is distinct from the cloud provider network.

The operations 600 further include, at block 606, sending, by the control plane to the one or more agents, instructions to obtain the set of container images from the container registry, wherein the instructions include staggered times for the one or more agents to initiate requests to the container registry.

In some examples, the staggered times are selected based on at least one of: a size of the container image, historical download speeds, a number of agents in the network that is distinct from the cloud provider network, a frequency with which the agent pulls the container image from the registry, or a measurement obtained by the agent reflecting current network performance in the computing environment.

In some examples, the operations further include obtaining an indication from the container registry that an update to the container image is available at the container registry; and wherein the control plane selects the staggered times responsive to the indication that the update to the container image is available.

In some examples, the container registry executes on computing resources in the computing environment, and wherein the container registry obtains the container image from a container registry service provided by the cloud provider network.

In some examples, the operations further include receiving, by the control plane, a request to launch a container via an agent of the one or more agents before a staggered time associated with the agent; and causing the agent to request the container image from the container registry prior to the staggered time.

In some examples, an agent of the one or more agents stores, in a local container image cache at a computing device on which the agent is executing, the container image, and wherein the agent relaunches the container based on the container image stored in the local container image cache.

In some examples, an agent of the one or more agents determines to launch the container based on a task or service definition obtained by the agent from a container service of the cloud provider network, and wherein the task or service definition includes an identifier of the container image.

In some examples, the operations further include obtaining, by the control plane, a measurement of performance characteristics of an intermediate network connecting the cloud provider network to the network that is distinct from the cloud provider network; and wherein the control plane determines the staggered times based in part on the measurement of performance characteristics of the intermediate network.

In some examples, an agent of the one or more agents provides the container image to at least one other computing device of the plurality of computing devices.

In some examples, the operations further include providing, by the control plane, an indication that an update to the container image is available at the container registry, wherein the indication is provided via a message queuing service provided by the cloud provider network; and wherein the control plane selects the staggered times responsive to the indication that the update to the container image is available.

In some examples, each agent is configured to launch and manage containers in a virtual machine (VM) instance executing on a host in coordination with the control plane of the cloud provider network.

FIG. 7 is a flow diagram illustrating operations 700 of a method for optimizing the retrieval of container images by enabling container instances running in a computing environment that is distinct from a cloud provider network to pull container images from local caches in some embodiments. Some or all of the operations 700 (or other processes described herein, or variations, and/or combinations thereof) are performed under the control of one or more computer systems configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some embodiments, one or more (or all) of the operations 700 are performed by a control plane 134 of the other figures.

The operations 700 include, at block 702, receiving, by a control plane of a cloud provider network, from an agent executing in a network that is distinct from the cloud provider network, a request to pull a container image from a container registry hosted in the cloud provider network.

The operations 700 further include, at block 704, determining, by the control plane, that a different request for the container image has been received from another agent executing in the network that is distinct from the cloud provider network.

The operations 700 further include, at block 706, sending, by the control plane to the agent, instructions to obtain the container image from a local cache located in the network that is distinct from the cloud provider network.

In some examples, the local cache is hosted on one of: a host executing the another agent, or a host that is distinct from the agent and the another agent.

In some examples, the control plane buffers requests received from the network that is distinct from the cloud provider network, and wherein the control plane determines that the different request for the container image has been received from another agent by analyzing requests stored in a buffer.

In some examples, the control plane receives a request to pull the container image from a plurality of agents including the agent, and wherein the control plane sends instructions to each of the plurality of agents to obtain the container image from the local cache located in the network that is distinct from the cloud provider network.

In some examples, the container image is a first container image, and wherein the operations further include: receiving, from the agent, a request to pull a second container image from the container registry; determining, by the control plane, that a different request for the second container image has been received from a third agent executing in the network that is distinct from the cloud provider network; and sending, by the control plane to the second agent, instructions to obtain the container image from a local cache associated with the third agent.

In some examples, an agent of the one or more agents stores, in a local container image cache at a computing device on which the agent is executing, the container image, and wherein the agent relaunches the container based on the container image stored in the local container image cache.

In some examples, an agent of the one or more agents determines to launch the container based on a task or service definition obtained by the agent from a container service of the cloud provider network, and wherein the task or service definition includes an identifier of the container image.

In some examples, the operations further include obtaining, by the control plane, a measurement of performance characteristics of an intermediate network connecting the cloud provider network to the network that is distinct from the cloud provider network; and wherein the control plane determines the staggered times based in part on the measurement of performance characteristics of the intermediate network.

In some examples, the agent provides the container image to at least one other agent.

In some examples, the operations further include providing, by the control plane, an indication that an update to the container image is available at the container registry, wherein the indication is provided via a message queuing service provided by the cloud provider network; and wherein the control plane selects the staggered times responsive to the indication that the update to the container image is available.

Figure 8:
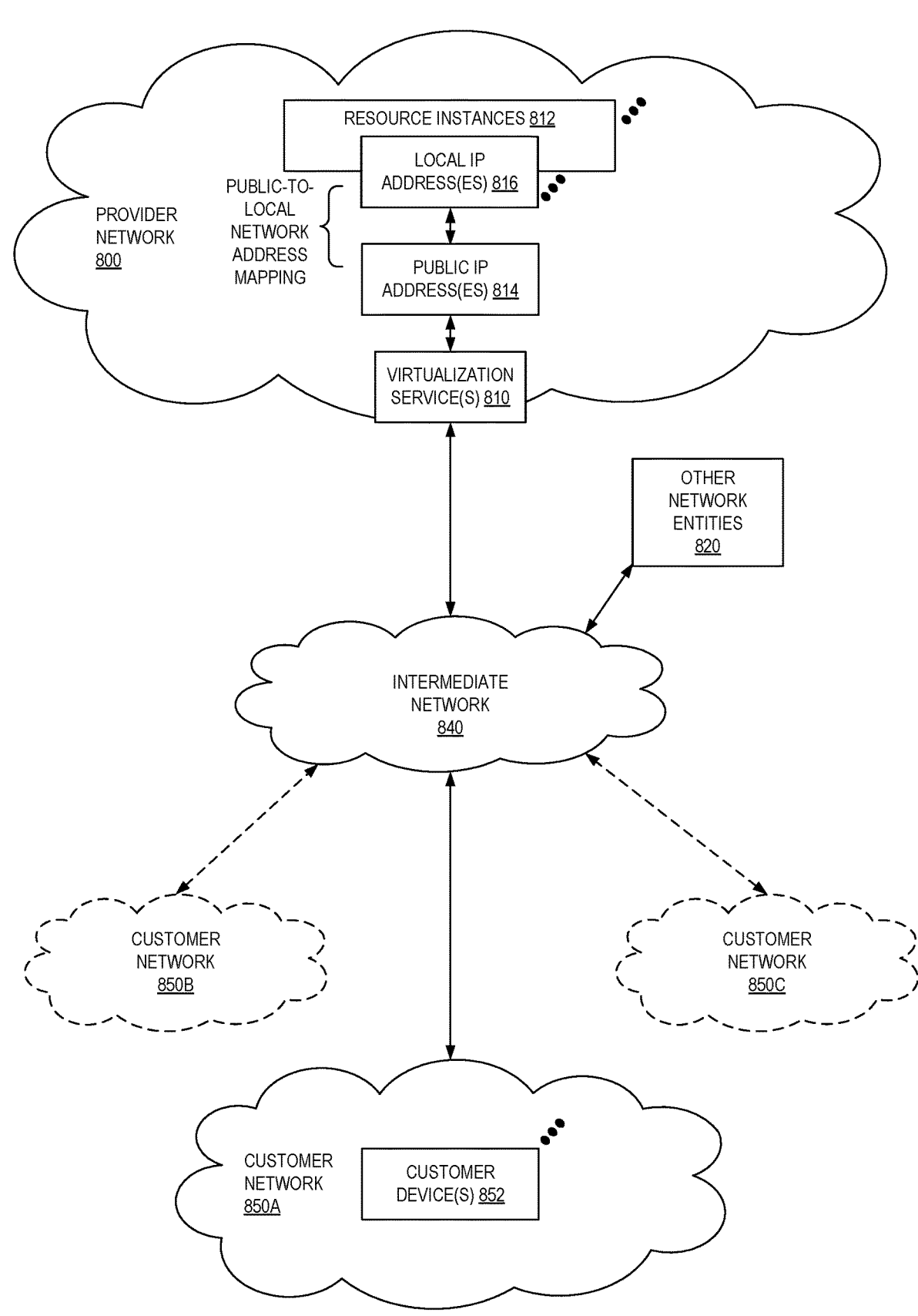
FIG. 8 illustrates an example provider network environment according to some examples.

FIG. 8 illustrates an example provider network (or "service provider system") environment according to some embodiments. A provider network 800 can provide resource virtualization to customers via one or more virtualization services 810 that allow customers to purchase, rent, or otherwise obtain instances 812 of virtualized resources, including but not limited to computation and storage resources, implemented on devices within the provider network or networks in one or more data centers. Local Internet Protocol (IP) addresses 816 can be associated with the resource instances 812; the local IP addresses are the internal network addresses of the resource instances 812 on the provider network 800. In some embodiments, the provider network 800 can also provide public IP addresses 814 and/or public IP address ranges (e.g., Internet Protocol version 4 (IPv4) or Internet Protocol version 6 (Ipv6) addresses) that customers can obtain from the provider 800.

Conventionally, the provider network 800, via the virtualization services 810, can allow a customer of the service provider (e.g., a customer that operates one or more customer networks 850A-850C (or "client networks") including one or more customer device(s) 852) to dynamically associate at least some public IP addresses 814 assigned or allocated to the customer with particular resource instances 812 assigned to the customer. The provider network 800 can also allow the customer to remap a public IP address 814, previously mapped to one virtualized computing resource instance 812 allocated to the customer, to another virtualized computing resource instance 812 that is also allocated to the customer. Using the virtualized computing resource instances 812 and public IP addresses 814 provided by the service provider, a customer of the service provider such as the operator of the customer network(s) 850A-850C can, for example, implement customer-specific applications and present the customer's applications on an intermediate network 840, such as the Internet. Other network entities 820 on the intermediate network 840 can then generate traffic to a destination public IP address 814 published by the customer network(s) 850A-850C; the traffic is routed to the service provider data center, and at the data center is routed, via a network substrate, to the local IP address 816 of the virtualized computing resource instance 812 currently mapped to the destination public IP address 814. Similarly, response traffic from the virtualized computing resource instance 812 can be routed via the network substrate back onto the intermediate network 840 to the source entity 820.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and can be mutable within the provider network. Network traffic originating outside the provider network is not directly routed to local IP addresses; instead, the traffic uses public IP addresses that are mapped to the local IP addresses of the resource instances. The provider network can include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses can be assigned by the provider network infrastructure to particular resource instances; these public IP addresses can be referred to as standard public IP addresses, or simply standard IP addresses. In some embodiments, the mapping of a standard IP address to a local IP address of a resource instance is the default launch configuration for all resource instance types.

At least some public IP addresses can be allocated to or obtained by customers of the provider network 800; a customer can then assign their allocated public IP addresses to particular resource instances allocated to the customer. These public IP addresses can be referred to as customer public IP addresses, or simply customer IP addresses. Instead of being assigned by the provider network 800 to resource instances as in the case of standard IP addresses, customer IP addresses can be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 9:
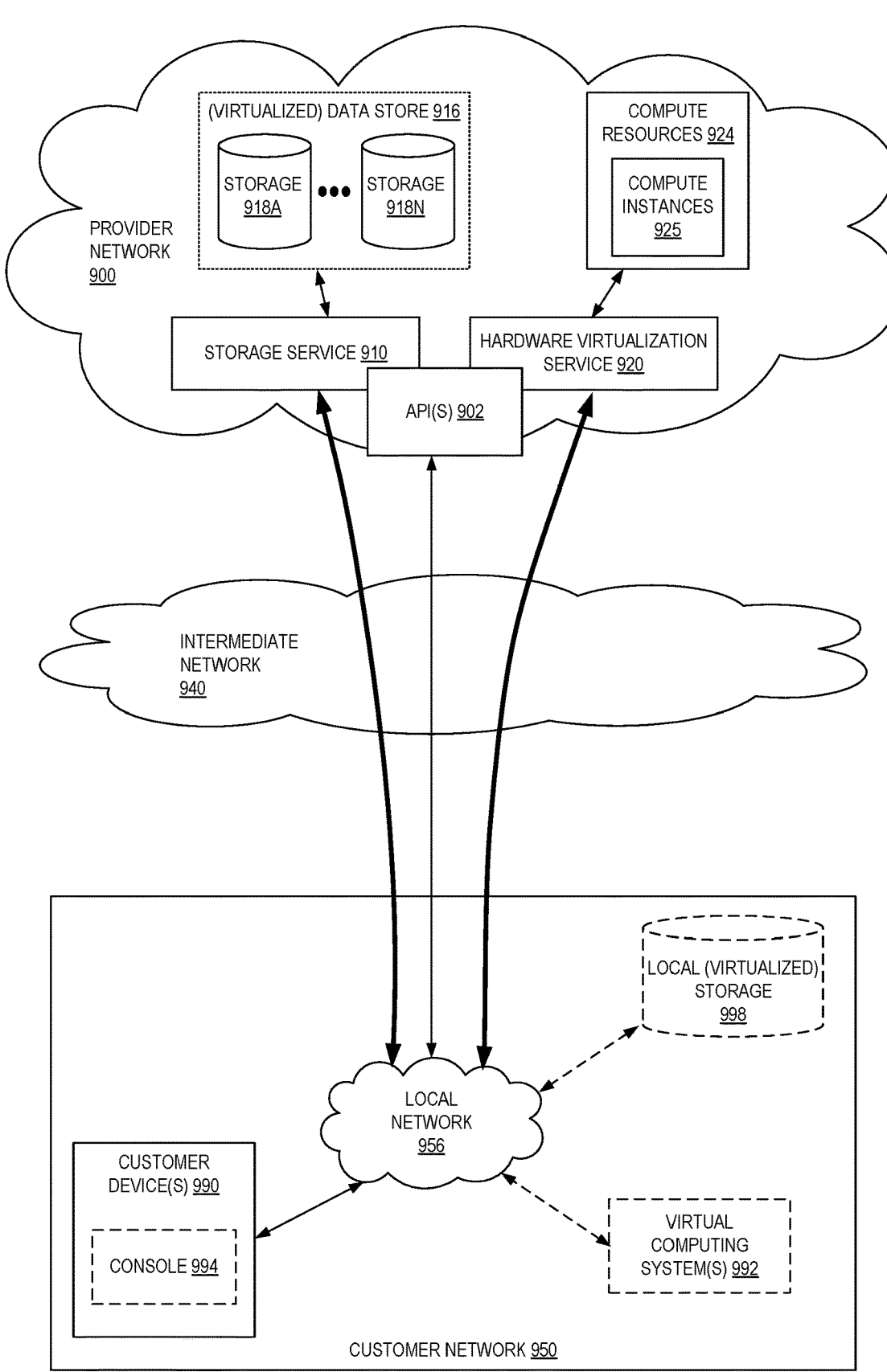
FIG. 9 is a block diagram of an example provider network that provides a storage service and a hardware virtualization service to customers according to some examples.

FIG. 9 is a block diagram of an example provider network environment that provides a storage service and a hardware virtualization service to customers, according to some embodiments. A hardware virtualization service 920 provides multiple compute resources 924 (e.g., compute instances 925, such as VMs) to customers. The compute resources 924 can, for example, be provided as a service to customers of a provider network 900 (e.g., to a customer that implements a customer network 950). Each computation resource 924 can be provided with one or more local IP addresses. The provider network 900 can be configured to route packets from the local IP addresses of the compute resources 924 to public Internet destinations, and from public Internet sources to the local IP addresses of the compute resources 924.

The provider network 900 can provide the customer network 950, for example coupled to an intermediate network 940 via a local network 956, the ability to implement virtual computing systems 992 via the hardware virtualization service 920 coupled to the intermediate network 940 and to the provider network 900. In some embodiments, the hardware virtualization service 920 can provide one or more APIs 902, for example a web services interface, via which the customer network 950 can access functionality provided by the hardware virtualization service 920, for example via a console 994 (e.g., a web-based application, standalone application, mobile application, etc.) of a customer device 990. In some embodiments, at the provider network 900, each virtual computing system 992 at the customer network 950 can correspond to a computation resource 924 that is leased, rented, or otherwise provided to the customer network 950.

From an instance of the virtual computing system(s) 992 and/or another customer device 990 (e.g., via console 994), the customer can access the functionality of a storage service 910, for example via the one or more APIs 902, to access data from and store data to storage resources 918A-918N of a virtual data store 916 (e.g., a folder or "bucket," a virtualized volume, a database, etc.) provided by the provider network 900. In some embodiments, a virtualized data store gateway (not shown) can be provided at the customer network 950 that can locally cache at least some data, for example frequently accessed or critical data, and that can communicate with the storage service 910 via one or more communications channels to upload new or modified data from a local cache so that the primary store of data (the virtualized data store 916) is maintained. In some embodiments, a user, via the virtual computing system 992 and/or another customer device 990, can mount and access virtual data store 916 volumes via the storage service 910 acting as a storage virtualization service, and these volumes can appear to the user as local (virtualized) storage 998.

While not shown in FIG. 9, the virtualization service(s) can also be accessed from resource instances within the provider network 900 via the API(s) 902. For example, a customer, appliance service provider, or other entity can access a virtualization service from within a respective virtual network on the provider network 900 via the API(s) 902 to request allocation of one or more resource instances within the virtual network or within another virtual network.

Figure 10:
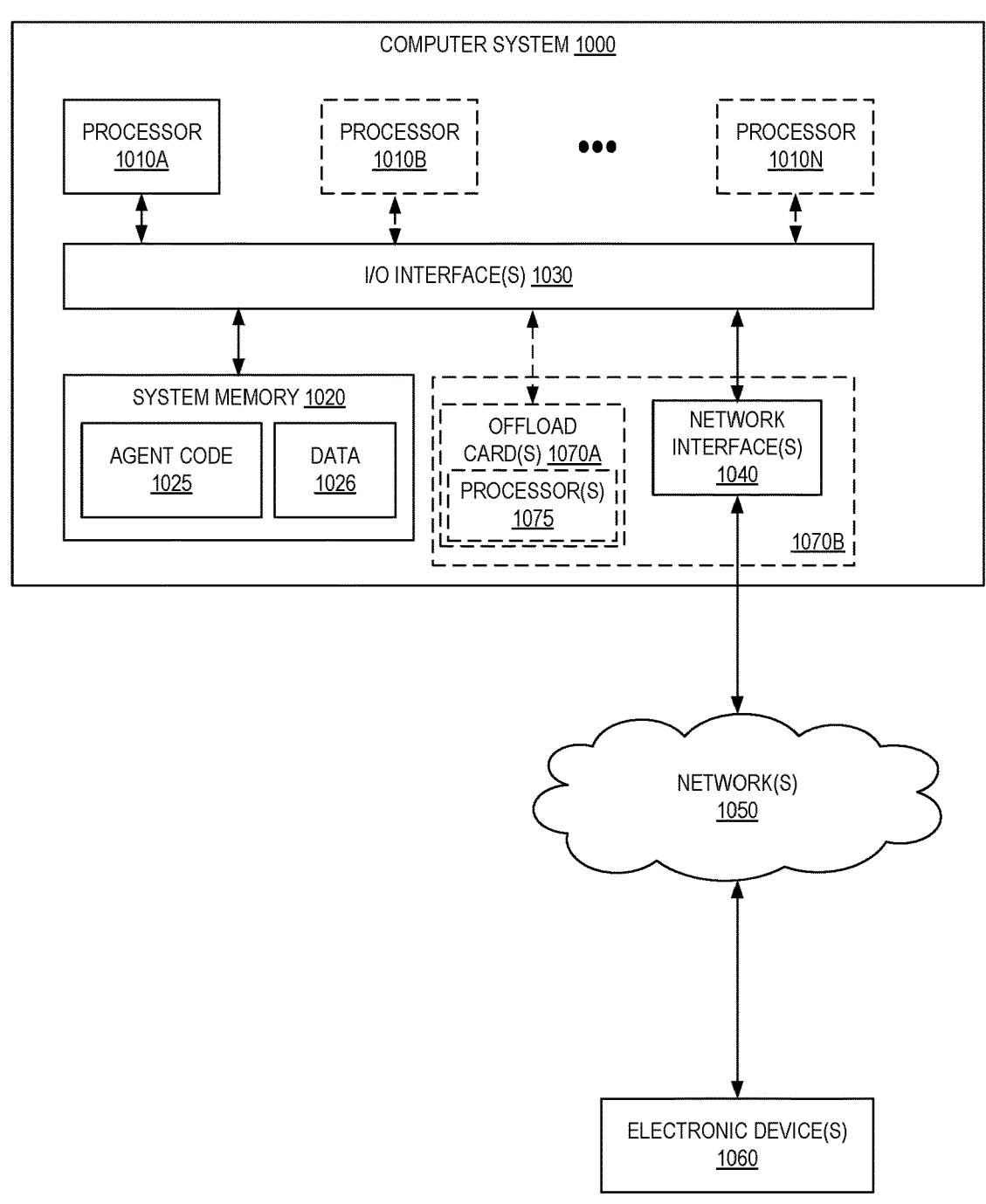
FIG. 10 is a block diagram illustrating an example computer system that can be used in some examples.

In some embodiments, a system that implements a portion or all of the techniques described herein can include a general-purpose computer system, such as the computer system 1000 illustrated in FIG. 10, that includes, or is configured to access, one or more computer-accessible media. In the illustrated embodiment, the computer system 1000 includes one or more processors 1010 coupled to a system memory 1020 via an input/output (I/O) interface 1030. The computer system 1000 further includes a network interface 1040 coupled to the I/O interface 1030. While FIG. 10 shows the computer system 1000 as a single computing device, in various embodiments the computer system 1000 can include one computing device or any number of computing devices configured to work together as a single computer system 1000.

In various embodiments, the computer system 1000 can be a uniprocessor system including one processor 1010, or a multiprocessor system including several processors 1010 (e.g., two, four, eight, or another suitable number). The processor(s) 1010 can be any suitable processor(s) capable of executing instructions. For example, in various embodiments, the processor(s) 1010 can be general-purpose or embedded processors implementing any of a variety of instruction set architectures (ISAs), such as the x86, ARM, PowerPC, SPARC, or MIPS ISAs, or any other suitable ISA. In multiprocessor systems, each of the processors 1010 can commonly, but not necessarily, implement the same ISA.

The system memory 1020 can store instructions and data accessible by the processor(s) 1010. In various embodiments, the system memory 1020 can be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within the system memory 1020 as agent code 1025 (e.g., executable to implement, in whole or in part, an agent 120) and data 1026.

In some embodiments, the I/O interface 1030 can be configured to coordinate I/O traffic between the processor 1010, the system memory 1020, and any peripheral devices in the device, including the network interface 1040 and/or other peripheral interfaces (not shown). In some embodiments, the I/O interface 1030 can perform any necessary protocol, timing, or other data transformations to convert data signals from one component (e.g., the system memory 1020) into a format suitable for use by another component (e.g., the processor 1010). In some embodiments, the I/O interface 1030 can include support for devices attached through various types of peripheral buses, such as a variant of the Peripheral Component Interconnect (PCI) bus standard or the Universal Serial Bus (USB) standard, for example. In some embodiments, the function of the I/O interface 1030 can be split into two or more separate components, such as a north bridge and a south bridge, for example. Also, in some embodiments, some or all of the functionality of the I/O interface 1030, such as an interface to the system memory 1020, can be incorporated directly into the processor 1010.

The network interface 1040 can be configured to allow data to be exchanged between the computer system 1000 and other devices 1060 attached to a network or networks 1050, such as other computer systems or devices as illustrated in FIG. 1, for example. In various embodiments, the network interface 1040 can support communication via any suitable wired or wireless general data networks, such as types of Ethernet network, for example. Additionally, the network interface 1040 can support communication via telecommunications/telephony networks, such as analog voice networks or digital fiber communications networks, via storage area networks (SANs), such as Fibre Channel SANs, and/or via any other suitable type of network and/or protocol.

In some embodiments, the computer system 1000 includes one or more offload cards 1070A or 1070B (including one or more processors 1075, and possibly including the one or more network interfaces 1040) that are connected using the I/O interface 1030 (e.g., a bus implementing a version of the Peripheral Component Interconnect-Express (PCI-E) standard, or another interconnect such as a Quick-Path interconnect (QPI) or UltraPath interconnect (UPI)). For example, in some embodiments the computer system 1000 can act as a host electronic device (e.g., operating as part of a hardware virtualization service) that hosts compute resources such as compute instances, and the one or more offload cards 1070A or 1070B execute a virtualization manager that can manage compute instances that execute on the host electronic device. As an example, in some embodiments the offload card(s) 1070A or 1070B can perform compute instance management operations, such as pausing and/or un-pausing compute instances, launching and/or terminating compute instances, performing memory transfer/copying operations, etc. These management operations can, in some embodiments, be performed by the offload card(s) 1070A or 1070B in coordination with a hypervisor (e.g., upon a request from a hypervisor) that is executed by the other processors 1010A-1010N of the computer system 1000. However, in some embodiments the virtualization manager implemented by the offload card(s) 1070A or 1070B can accommodate requests from other entities (e.g., from compute instances themselves), and can not coordinate with (or service) any separate hypervisor.

In some embodiments, the system memory 1020 can be one embodiment of a computer-accessible medium configured to store program instructions and data as described above. However, in other embodiments, program instructions and/or data can be received, sent, or stored upon different types of computer-accessible media. Generally speaking, a computer-accessible medium can include any non-transitory storage media or memory media such as magnetic or optical media, e.g., disk or DVD/CD coupled to the computer system 1000 via the I/O interface 1030. A non-transitory computer-accessible storage medium can also include any volatile or non-volatile media such as RAM (e.g., SDRAM, double data rate (DDR) SDRAM, SRAM, etc.), read only memory (ROM), etc., that can be included in some embodiments of the computer system 1000 as the system memory 1020 or another type of memory. Further, a computer-accessible medium can include transmission media or signals such as electrical, electromagnetic, or digital signals, conveyed via a communication medium such as a network and/or a wireless link, such as can be implemented via the network interface 1040.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments use at least one network that would be familiar to those skilled in the art for supporting communications using any of a variety of widely available protocols, such as Transmission Control Protocol/Internet Protocol (TCP/IP), File Transfer Protocol (FTP), Universal Plug and Play (uPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments using a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also can be capable of executing programs or scripts in response requests from user devices, such as by executing one or more Web applications that can be implemented as one or more scripts or programs written in any programming language, such as Java®, C, C# or C++, or any scripting language, such as Perl, Python, PHP, or TCL, as well as combinations thereof. The server(s) can also include database servers, including without limitation those commercially available from Oracle(R), Microsoft(R), Sybase(R), IBM(R), etc. The database servers can be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information can reside in a storage-area network (SAN) familiar to those skilled in the art. Similarly, any necessary files for performing the functions attributed to the computers, servers, or other network devices can be stored locally and/or remotely, as appropriate. Where a system includes computerized devices, each such device can include hardware elements that can be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system can also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments can have numerous variations from that described above. For example, customized hardware might also be used and/or particular elements might be implemented in hardware, software (including portable software, such as applets), or both. Further, connection to other computing devices such as network input/output devices can be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments can be practiced without the specific details. Furthermore, well-known features can be omitted or simplified in order not to obscure the embodiment being described.

Bracketed text and blocks with dashed borders (e.g., large dashes, small dashes, dot-dash, and dots) are used herein to illustrate optional aspects that add additional features to some embodiments. However, such notation should not be taken to mean that these are the only options or optional operations, and/or that blocks with solid borders are not optional in certain embodiments.

Reference numerals with suffix letters (e.g., 718A-718N) can be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters might or might not have the same number of instances in various embodiments.

References to "one embodiment," "an embodiment," "an example embodiment," etc., indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). Similarly, language such as "at least one or more of A, B, and C" (or "one or more of A, B, and C") is intended to be understood to mean A, B, or C, or any combination thereof (e.g., A, B, and/or C). As such, disjunctive language is not intended to, nor should it be understood to, imply that a given embodiment requires at least one of A, at least one of B, and at least one of C to each be present.

As used herein, the term "based on" (or similar) is an open-ended term used to describe one or more factors that affect a determination or other action. It is to be understood that this term does not foreclose additional factors that may affect a determination or action. For example, a determination may be solely based on the factor(s) listed or based on the factor(s) and one or more additional factors. Thus, if an action A is "based on" B, it is to be understood that B is one factor that affects action A, but this does not foreclose the action from also being based on one or multiple other factors, such as factor C. However, in some instances, action A may be based entirely on B.

Unless otherwise explicitly stated, articles such as "a" or "an" should generally be interpreted to include one or multiple described items. Accordingly, phrases such as "a device configured to" or "a computing device" are intended to include one or multiple recited devices. Such one or more recited devices can be collectively configured to carry out the stated operations. For example, "a processor configured to carry out operations A, B, and C" can include a first processor configured to carry out operation A working in conjunction with a second processor configured to carry out operations B and C.

Further, the words "may" or "can" are used in a permissive sense (i.e., meaning having the potential to), rather than the mandatory sense (i.e., meaning must). The words "include," "including," and "includes" are used to indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for the nouns that they precede, and do not imply any type of ordering (e.g., spatial, temporal, logical, etc.) unless such an ordering is otherwise explicitly indicated.

The specification and drawings are, accordingly, to be regarded in an illustrative rather than a restrictive sense. It will, however, be evident that various modifications and changes can be made thereunto without departing from the broader scope of the disclosure as set forth in the claims.

What is claimed is:

1. A computer-implemented method comprising:

receiving, by a control plane of a cloud provider network, from an agent executing in a network that is distinct from the cloud provider network, a request to pull a container image from a container registry hosted in the cloud provider network, wherein the agent is configured to launch and manage a container in a virtual machine (VM) instance executing on a host in coordination with the control plane of the cloud provider network;

determining, by the control plane, that a different request for the container image has been received from another agent executing in the network that is distinct from the cloud provider network; and responsive to the determining, sending, by the control plane to the agent, instructions to obtain the container image from a local cache located in the network that is distinct from the cloud provider network, wherein the instructions are configured to cause the agent to obtain the container image from the local cache located in the network that is distinct from the cloud provider network.

2. The computer-implemented method of claim 1, wherein the local cache is hosted on one of: a host executing the another agent, or a host that is distinct from the agent and the another agent.

3. The computer-implemented method of claim 1, wherein the control plane buffers requests received from the network that is distinct from the cloud provider network, and wherein the control plane determines that the different request for the container image has been received from the another agent by analyzing requests stored in a buffer.

4. A computer-implemented method comprising:

receiving, by a control plane of a cloud provider network, from an agent executing in a network that is distinct from the cloud provider network, a request to pull a container image from a container registry hosted in the cloud provider network;

determining, by the control plane, that a different request for the container image has been received from another agent executing in the network that is distinct from the cloud provider network; and responsive to the determining, sending, by the control plane to the agent, instructions to obtain the container image from a local cache located in the network that is distinct from the cloud provider network, wherein the instructions are configured to cause the agent to obtain the container image from the local cache located in the network that is distinct from the cloud provider network.

5. The computer-implemented method of claim 4, wherein the local cache is hosted on one of: a host executing the another agent, or a host that is distinct from the agent and the another agent.

6. The computer-implemented method of claim 4, wherein the control plane buffers requests received from the network that is distinct from the cloud provider network, and wherein the control plane determines that the different request for the container image has been received from the another agent by analyzing requests stored in a buffer.

7. The computer-implemented method of claim 4, wherein the control plane receives a request to pull the container image from a plurality of agents including the agent, and wherein the control plane sends instructions to each of the plurality of agents to obtain the container image from the local cache located in the network that is distinct from the cloud provider network.

8. The computer-implemented method of claim 4, wherein the container image is a first container image, and wherein the method further comprises:

receiving, from the agent, a request to pull a second container image from the container registry;

determining, by the control plane, that a different request for the second container image has been received from a third agent executing in the network that is distinct from the cloud provider network; and sending, by the control plane to the third agent, instructions to obtain the container image from a local cache associated with the third agent.

9. The computer-implemented method of claim 4, wherein the agent stores, in a local container image cache at a computing device on which the agent is executing, the container image, and wherein the agent relaunches a container based on the container image stored in the local container image cache.

10. The computer-implemented method of claim 9, wherein the agent determines to relaunch the container based on a task or service definition obtained by the agent from a container service of the cloud provider network, and wherein the task or service definition includes an identifier of the container image.

11. The computer-implemented method of claim 4, wherein the agent provides the container image to at least one other agent.

12. The computer-implemented method of claim 4, wherein the agent is configured to launch and manage a container in a virtual machine (VM) instance executing on a host in coordination with the control plane of the cloud provider network.

13. A system comprising:

a first one or more electronic devices to implement a control plane of a cloud provider network, wherein the control plane includes instructions that upon execution cause the control plane to:

receive from an agent executing in a network that is distinct from the cloud provider network, a request to pull a container image from a container registry hosted in the cloud provider network, determine that a different request for the container image has been received from another agent executing in the network that is distinct from the cloud provider network, and responsive to the determining, send instructions to the agent to obtain the container image from a local cache located in the network that is distinct from the cloud provider network, wherein the instructions are configured to cause the agent to obtain the container image from the local cache located in the network that is distinct from the cloud provider network; and a second one or more electronic devices to implement the container registry, wherein the container registry includes instructions that upon execution cause the container registry to provide the container image to the another agent.

14. The system of claim 13, wherein the local cache is hosted on one of: a host executing the another agent, or a host that is distinct from the agent and the another agent.

15. The system of claim 13, wherein the control plane buffers requests received from the network that is distinct from the cloud provider network, and wherein the control plane determines that the different request for the container image has been received from the another agent by analyzing requests stored in a buffer.

16. The system of claim 13, wherein the control plane receives a request to pull the container image from a plurality of agents including the agent, and wherein the control plane sends instructions to each of the plurality of agents to obtain the container image from the local cache located in the network that is distinct from the cloud provider network.

17. The system of claim 13, wherein the container image is a first container image, and wherein the control plane further includes instructions that upon execution cause the control plane to:

receive, from the agent, a request to pull a second container image from the container registry;

determine, by the control plane, that a different request for the second container image has been received from a third agent executing in the network that is distinct from the cloud provider network; and send, by the control plane to the third agent, instructions to obtain the container image from a local cache associated with the third agent.

18. The system of claim 13, wherein the agent stores, in a local container image cache at a computing device on which the agent is executing, the container image, and wherein the agent relaunches a container based on the container image stored in the local container image cache.

19. The system of claim 18, wherein the agent determines to relaunch the container based on a task or service definition obtained by the agent from a container service of the cloud provider network, and wherein the task or service definition includes an identifier of the container image.

20. The system of claim 13, wherein the agent provides the container image to at least one other agent.

\* \* \* \* \*